United States Patent [19]

Lopetegui Legorburu

[11] 4,367,669
[45] Jan. 11, 1983

[54] DEVICE FOR CUTTING ANGULAR PROFILES APPLICABLE TO HYDRAULIC SHEARS

[75] Inventor: José A. Lopetegui Legorburu, Guipúzcoa, Spain

[73] Assignee: Maquinaria Geka, S.L., Oyarzun, Spain

[21] Appl. No.: 213,152

[22] Filed: Dec. 4, 1980

[30] Foreign Application Priority Data

Apr. 7, 1980 [ES] Spain .................................. 249.858

[51] Int. Cl.³ ...................... B23D 15/04; B23D 23/00
[52] U.S. Cl. ........................................ 83/579; 83/580; 83/608; 83/699
[58] Field of Search ................ 83/608, 694, 699, 640, 83/605, 609, 556, 580, 646, 698, 579

[56] References Cited

U.S. PATENT DOCUMENTS

| 532,521 | 1/1895 | Bender et al. | ..................... 83/608 X |
| 3,555,954 | 1/1971 | Payne et al. | ......................... 83/699 |
| 3,866,522 | 2/1975 | Oswalt, Jr. | ....................... 83/608 X |

Primary Examiner—Frank T. Yost
Attorney, Agent, or Firm—Wenderoth, Lind & Ponack

[57] ABSTRACT

A knife cutter for the angular profiles includes a plate, generally triangular in shape, the posterior surface of which has a prismatic projection corresponding to one of the sides thereof. The side and the prismatic projection are arched in order to adjust in a complementary recess made for such purpose in the front surface of the knife bearing plate. The other two sides of the knife or the cutting edges thereof form a dihedral and are parallel to the cutting edges of a counter-knife.

2 Claims, 5 Drawing Figures

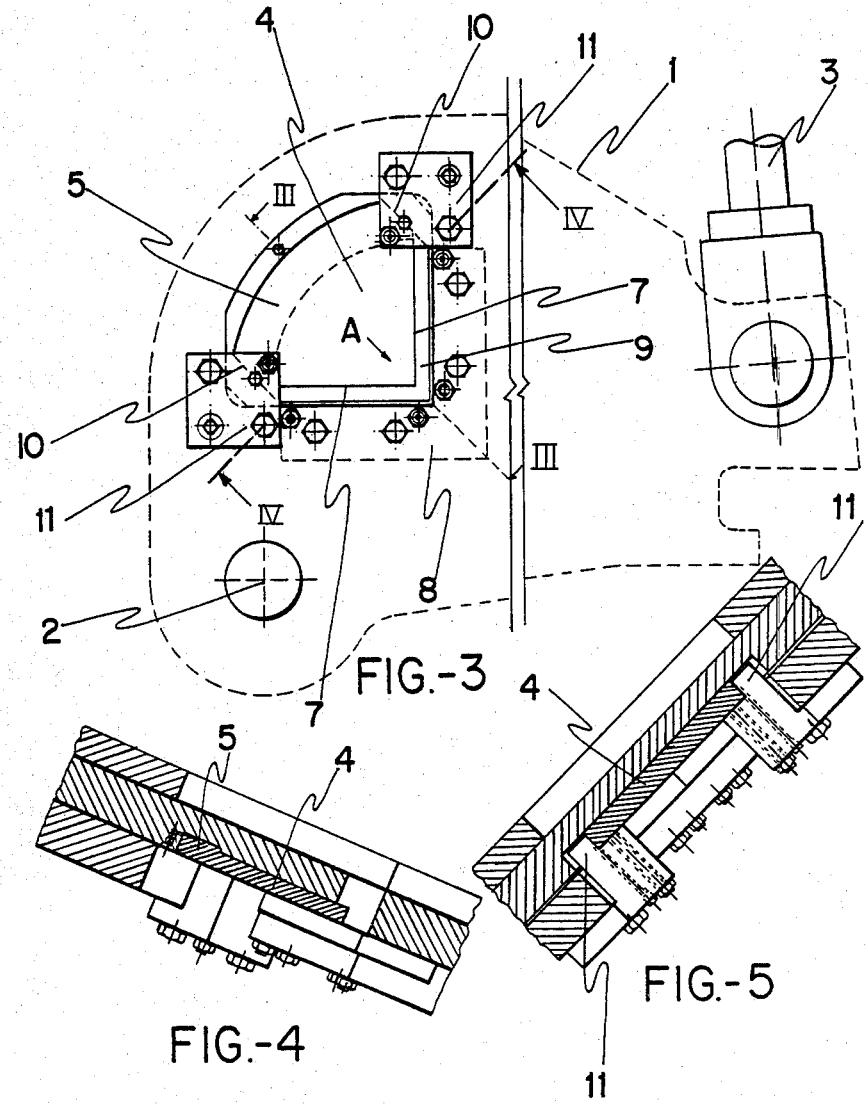

DEVICE FOR CUTTING ANGULAR PROFILES APPLICABLE TO HYDRAULIC SHEARS

BACKGROUND OF THE INVENTION

The present invention relates to a device for cutting angular profiles, the device particularly being applicable to hydraulic shears.

The object of the device of the invention is to cut angular profiles, i.e. members having an angular transverse cross-sectional configuration, without producing any deformation or loss of material. The device of the invention comprises a plate, acting as the knife bearer, mounted on a shaft about which it can make partial reciprocating turns by means of a hydraulic pressure cylinder.

The main feature of the invention resides in the original structure and in the arrangement of the knife with respect to the mentioned plate, so that during angular movement of the plate, the knife which cuts the angular profiles moves in a direction such that the cutting edges thereof are always parallel to the wings of the profiles. Thus, a clean cutting of the profile takes place, i.e. without deformation or loss of material.

This is very important since deformation and loss of material do occur when using known hydraulic shears due to the following:

In one type of hydraulic shear the material is deformed since the knife is mounted on the knife bearing plate in a fixed and rigid manner. Thus, the knife follows the angular movement of the plate and, naturally, it does not extend parallel on the profile to be cut.

In another type of hydraulic shear the material to be cut is lost since the knife, in order to facilitate cutting, has an angle greater than 90°. Besides, this type of shear has two knives, one at each side of the knife cutter, with a separation equal to the thickness of the knife cutter, and it is precisely this which causes a portion of the material to be lost during cutting.

SUMMARY OF THE INVENTION

In the case of the present invention, deformation and loss of material do not take place due to the specific characteristics of the knife and to the way in which the knife is mounted on the knife bearing plate.

The cutting device of the invention is characterised in that it comprises a plate, generally triangular in shape, a rear surface of which has a prismatic projection corresponding to one of the sides thereof. The prismatic projection, and consequently the side where such projection is located, is arched and adjusts to a complementary recess provided for such purpose in the front surface of the knife bearing plate.

Furthermore, the knife is positioned between a pair of guides provided in the body of the machine. In this way, i.e. due to this original arrangement of the knife with respect to the knife bearing plate and due to the triangular shape thereof, when the mentioned knife bearing plate is moved in an angular direction, by means of a corresponding hydraulic pressure cylinder, the knife or triangular cutting plate is displaced in a linear direction following the bisecting line of the angle which is established by the cutting edges thereof, thereby proportioning a cut without deformation and without any loss of material since it rests on an angular profile to be cut, maintaining constant parallelism between the cutting edges thereof and the wings of the profile.

BRIEF DESCRIPTION OF THE DRAWINGS

For a better understanding of the structural characteristics and the functioning of the device of the present invention, reference will now be made to the accompanying drawings, wherein:

FIG. 3 is a front view of the assembly of the device including the bearing plate and a triangular knife supported thereby; and FIGS. 4 and 5 are cross-sectional views taken along lines III—III and IV—IV, respectively, of FIG. 3.

DETAILED DESCRIPTION OF THE INVENTION

Figure 1:
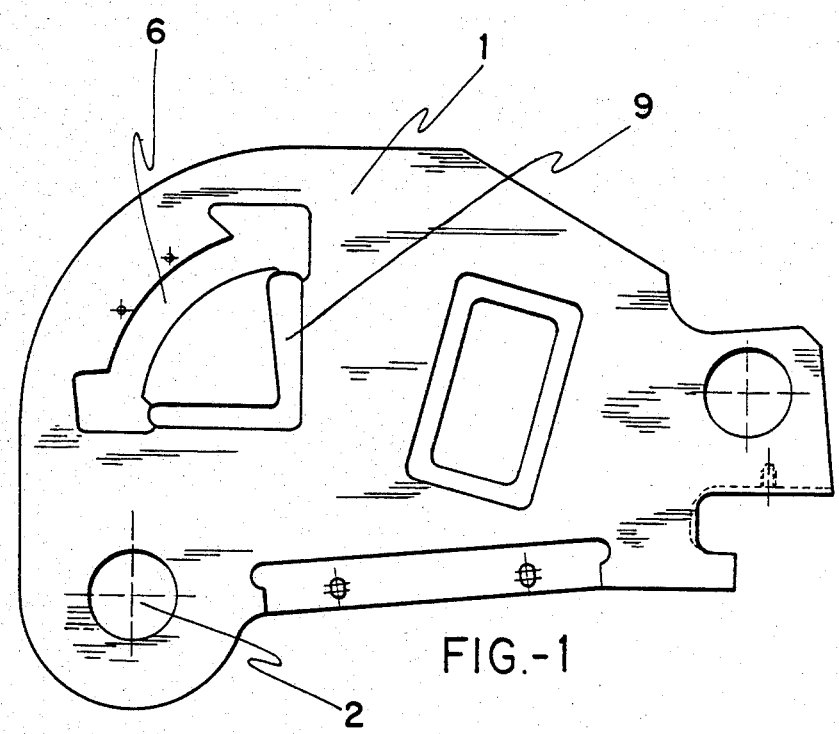
FIGS. 1 and 2 respectively are a front elevational view and a longitudinal sectional view of a knife bearing plate according to the invention.
Figure 2:
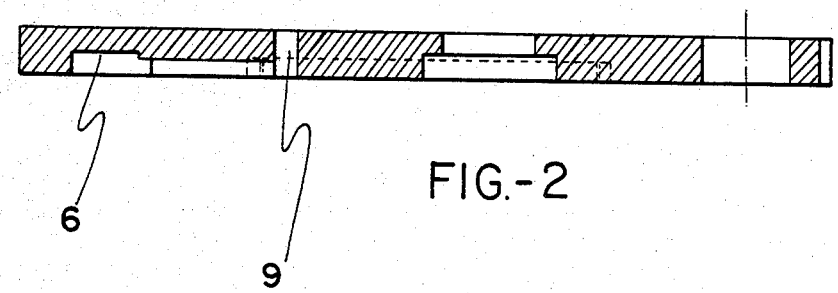

As can be seen, the device of the present invention comprises a plate 1 acting as a knife bearer and which is mounted to the general frame of the machine, through a hole 2, on a shaft about which the plate can make partial reciprocating turns by means of a hydraulic pressure cylinder, the rod 3 of which is represented in FIG. 3.

At the front surface of this plate 1 there is installed a knife 4 which is a plate, generally triangular in shape, the posterior or rear part of which has a prismatic projection 5 which follows an arched or curved path to be adjusted in a complementary recess 6 made for such purpose in the knife bearing plate 1, thus enabling relative movement along the complementary curves between plate 1 and knife 4.

The cutting edges 7 of the knife 4 form a straight dihedral and are positioned parallel to the cutting edges of a counterknife 8. Between this counterknife 8 and the knife 4 there is formed, in the knife bearing plate 1, a hollow or aperture 9 through which the angular profiles to be cut pass.

The vertices or corners 10 of the triangular plate or knife 4, common to the arched side and respective edges 7 thereof, are bevelled to be in sliding contact with guides 11 solidly attached to the body of the machine. Thus, due to angular movement of the knife bearing plate 1 about the shaft 2 by means of the pressure cylinder 3, the knife 4 cuts an angular profile or member inserted in the hollow 9. Arrow A indicates the radial movement which the knife 4 is necessarily forced to make due to the presence of the guides 11 which, as explained, are solidly attached to the body of the machine. In this way, when the knife 4 presses the angular profile to be cut, the cutting edges 7 are maintained parallel to the cutting edges of the counterknife 8 and also to the wings of the angular profile which is cut without deformation or loss of material.

I claim:

1. A device for use with hydraulic shears for cutting a member having an angular transverse cross-sectional configuration without deformation or loss of material of such member, said device comprising:

a knife bearer plate adapted to be mounted on a shaft for partial reciprocating angular movement thereabout by means of a hydraulic pressure cylinder, said knife bearer plate having in a front surface thereof a curved recess; and a knife plate of generally triangular shape and including two sides as cutting edges forming a dihedral and a curved third side, said knife plate having extending from a rear surface thereof, at a position adjacent said curved third side, a curved prismatic projection, the curve of said third side and the curve of said projection being complementary to the curve of said recess in said knife bearer plate, and said projection being fitted into said recess, thereby enabling relative movement between said knife plate and said knife bearer plate along said complementary curves, said cutting edges extending parallel to respective cutting edges of a counterknife.

2. A device as claimed in claim 1, wherein vertices of said knife plate, at areas of juncture of said cutting edges thereof with said third side thereof, are bevelled to form contact surfaces contacting guides fixed to the machine, so that when said knife bearer plate is moved in an angular direction, said knife plate is displaced in a linear direction along a line bisecting the angle between said cutting edges of said knife plate.

* * * * *